United States Patent Office 3,488,731
Patented Jan. 6, 1970

3,488,731
β-HALOALKYL ESTERS OF 3-INDOLYLACETIC ACIDS
Meyer Sletzinger, North Plainfield, N.J., assignor to Merck & Co., Inc., Rahway, N.J., a corporation of New Jersey
No Drawing. Filed July 26, 1967, Ser. No. 656,003
Int. Cl. C07d 27/56
U.S. Cl. 260—326.13
2 Claims

ABSTRACT OF THE DISCLOSURE

Process for preparing 1-acyl-3-indolyl acetic acids by acylating a β-haloalkyl-3-indolyl acetate and subsequent reductive dehydrohalogenation to form the desired free acid. These acids have known anti-inflammatory properties and are effective in the treatment of arthritic conditions which respond to treatment with anti-inflammatory agents.

BACKGROUND OF INVENTION

In the past in order to prepare a 1-acyl-indole-3-acetic acid from an indole-3-acetic acid, it had been necessary to first protect the acid side chain with an easily removable ester moiety. For this purpose the t-butyl ester was prepared. This acid side chain protection is necessary in order to allow for acylation of the indole at the N–1 nitrogen only without acylation of the side chain as well. By protecting the acid side chain as its ester, acylation was accomplished at the N–1 position only. However, because the N–1 acyl is susceptible to hydrolysis or saponification conditions, it was also necessary to prepare the t-butyl ester, which protective group could be removed under conditions such that the N–1 acyl would not be affected. Therefore, N–1 acyl indole-3-acetic acids have been prepared by esterifying an indole-3-acetic acid with t-butanol, acylating the indole ester and pyrolyzing the t-butyl N–1 acyl indole-3-acetate to form the corresponding free acid.

SUMMARY OF INVENTION

This invention describes the use of another protecting group which is adoptable to indole acetic acids. In accordance with this invention a β-halo alcohol is used as the protecting group for the acid side chain of an indole-3-acetic acid so as to allow N–1 acylation only. Accordingly, this invention therefore comprises the formation of a halo (alkyl, phenyl or ar-alkyl) ester of an indole-3-acetic acid, followed by acylation and subsequent reductive dehydrohalogenation and cleavage of the ester moiety to form the desired N–1 acyl indole-3-acetic acid.

DETAILED DESCRIPTION

This invention relates to a rocess for preparing 1-p-chlorobenzoyl-2-methyl-5-methoxy - (or dimethylamino)- 3-indolyl acetic acids and to novel intermediates thereof. The process consists of esterifying a known 2-methyl-5-methoxy-(or dimethylamino)-indole-3-acetic acid with a β-halo (alkyl, phenyl or ar-alkyl) alcohol. The critical feature of this invention resides in the fact that the alcohol used as the protecting group to form the ester must have at least one halogen substituent on the β-carbon. The alcohol used for the esterification may therefore be illustrated by the following formula:

$$R-\underset{\underset{R_1}{|}}{\overset{\overset{R_2}{|}}{C}}-CH_2-OH$$

wherein R, $R_1$ and $R_2$ may be hydrogen, halogen (chloro, bromo and the like), alkyl (such as lower alkyl, methyl, propyl, butyl and the like), phenyl, benzyl or substituted phenyl or benzyl, with at least one of R, $R_1$ and $R_2$ being halogen. As long as one of R, $R_1$ or $R_2$ is halogen, the remaining groups are not critical and may be any group as shown above. Preferably, however, the halo lower alkyl alcohols are used, especially di and tri chloroethanol.

The esterification may be carried out by any means well known to the art. After esterification, acylation is carried out with an acylating agent such as p-chlorobenzoyl chloride, anhydride or azide. The acylating agent is reacted with the N–1 alkali salt of the indole (which has been prepared by reaction with an alkali hydride and the required indole) in the presence of an inert solvent such as dimethylformamide. The thus formed N–1 acyl indole acetate is then reductively dehydrohalogenated and cleaved to form the desired N–1 acyl indole-3-acetic acid. The process may be represented as follows:

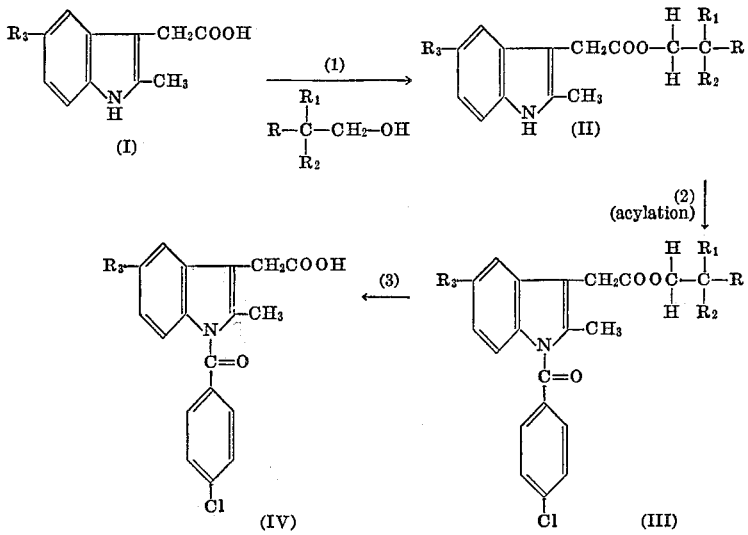

Step 1.—Esterification of the free acid by refluxing desired alcohol and indole in the presence of an acid such as p-toluene sulfonic acid. The compounds prepared in this step are novel and are a further embodiment of this invention.

Step 2.—The ester prepared in Step 1 is reacted with an alkali hydride preferably sodium hydride in an inert solvent such as dimethylformamide dioxane and the like at lower temperatures (i.e., 0–25° C.) to form the N–1 alkali salt. The salt is then reacted with a p-chlorobenzoyl halide, anhydride or azide or p-nitrophenyl ester of p-chlorobenzoic acid, preferably p-chlorobenzoyl chloride at low temperatures. The compounds prepared in this step are new intermediates and are a further aspect of this invention.

Step 3.—The acylated ester from Step 2 is subjected to reductive dehydrohalogenation and cleavage by heating with powdered zinc in a lower alkanoic acid solvent (such as acetic acid, butyric acid and the like), preferably acetic acid. The reaction is most efficiently carried out at temperatures of 40° C. to the reflux temperature of the solvent, preferably from 60 to 80° C.

The following examples are given by way of illustration.

EXAMPLE 1

β-Trichloroethyl 2-methyl-5-methoxyindole-3-acetate

To a solution of 0.1 mole of 2-methyl-5-methoxyindole-3-acetic acid and 0.15 mole of trichloroethanol in 100 ml. of benzene is added 100 mg. of p-toluenesulfonic acid and the reaction mixture refluxed using a Dean-Stark trap. After the theoretical amount of water is collected, the reaction mixture is cooled and the benzene solution washed with cold aqueous 3% sodium bicarbonate until the solution is neutral. The benzene solution is then dried with sodium sulfate and the benzene removed in vacuo to yield β-trichloroethyl 2 - methyl - 5 - methoxyindole-3-acetate.

Similarly, when β-bromoethanol, β-dichloropropanol, β-phenyl-β-dichloroethanol or β-benzyl-β-chloroethanol are used in place of β-trichloroethanol in the above procedure, there is obtained the corresponding 2-methyl-5-methoxyindole-3-acetates.

Similarly, when 2-methyl - 5 - dimethylaminoindole-3-acetic acid is used in the above example in place of 2-methyl-5-methoxyindole-3-acetic acid, there is obtained β-trichloroethyl 2-methyl-5-dimethylaminoindole - 3 - acetate.

EXAMPLE 2

β-Trichloroethyl 1-p-chlorobenzoyl-2-methyl-5-methoxy-3-indolyl acetate

To a suspension of 0.5 g. (50%) sodium hydride in 5 ml. of anhydrous dimethylformamide is added dropwise a solution of 3.5 g. of β-trichloroethyl 2-methyl-5-methoxyindole-3-acetate in 15 ml. of dimethylformamide at 0–10° C. under nitrogen with good stirring. After aging for 1 hour 1.90 g. of p-chlorobenzoyl chloride in 5 ml. of dimethylformamide is added slowly maintaining the temperature between 0–5° C. by external cooling. The reaction mixture is aged for 2 hours at room temperature, then poured into 150 ml. of ice-cold water containing 2 ml. of acetic acid. The precipitated β-trichloroethyl 1-p-chlorobenzoyl-2-methyl-5-methoxyindole - 3 - acetate is filtered, washed with water and dried in vacuo.

Similarly, when β-trichloroethyl 2-methyl-5-dimethyl-aminoindole-3-acetate is used in place of β-trichloroethyl 2-methyl-5-methoxyindole-3-acetate in the above example, there is obtained β-trichloroethyl 1-(p-chlorobenzoyl)-2-methyl-5-dimethylaminoindole-3-acetate.

Similarly, when the β-bromoethyl, β-dichloropropyl, β-phenyl-β-dichloroethyl or β-benzyl-β-chloroethyl indole esters prepared in Example 1 are used in place of β-trichloroethyl 2-methyl-5-methoxyindole-3-acetate in the above example, there are obtained the corresponding N-1 acyl indole esters.

EXAMPLE 3

1-p-chlorobenzoyl-2-methyl-5-methoxy-3-indolyl acetic acid

To a solution of 4.89 g. β-trichloroethyl 1-p-chloro-benzoyl-2-methyl-5-methoxyindole-3-acetate in 25 ml. of acetic acid at 60–80° C. is added 2.0 g. of powdered zinc portionwise over a period of 15 minutes. The mixture is heated at 80° C. for an additional 15 minutes, filtered while hot and the cake is washed twice with 2 ml. of acetic acid. The clean filtrate is concentrated to 10 ml., cooled to room temperature and diluted with 5 ml. of water. The precipitated 1-p-chlorobenzoyl - 2 - methyl-5-methoxyindole-3-acetic acid is filtered, the cake washed with water and the crude product recrystallized from t-butanol, M.P. 160° C.

Similarly, when β-trichloroethyl 1-p-chlorobenzoyl-2-methyl-5-dimethylaminoindole-3-acetate is used in the above example in place of β-trichloroethyl 1-p-chloro-benzoyl - 2 - methyl - 5 - methoxyindole-3-acetate, there is obtained 1-p-chlorobenzoyl - 2 - methyl-5-dimethylamino-indole-3-acetic acid.

Similarly, when the N–1 acyl indole esters obtained from Example 2 are used in place of β-trichloro 1-p-chlorobenzoyl-2-methyl-5-methoxyindole-3-acetate in the above example, there is obtained 1-p-chlorobenzoyl-2-methyl-5-methoxyindole-3-acetic acid.

I claim:
1. A compound of the formula:

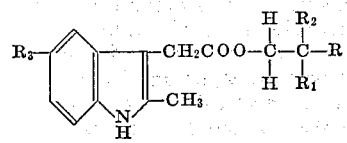

wherein R, $R_1$ and $R_2$ may be hydrogen, halogen, lower-alkyl benzyl or phenyl, at least one of R, $R_1$ and $R_2$ being halogen; and $R_3$ may be methoxy or dimethyl-amino.

2. A compound of the formula:

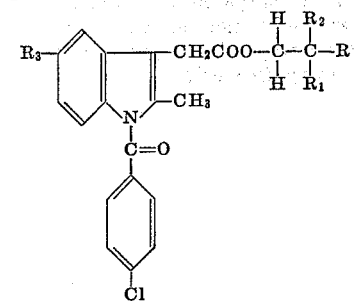

wherein R, $R_1$ and $R_2$ may be hydrogen, halogen, lower-alkyl, benzyl or phenyl, at least one of R, $R_1$ or $R_2$ being halogen, and $R_3$ may be methoxy or dimethylamino.

References Cited

UNITED STATES PATENTS 3,316,260   4/1967   Shen _____ 260—326.13 XR

ALEX MAZEL, Primary Examiner

J. A. NARCAVAGE, Assistant Examiner

U.S. Cl. X.R.
260—326.14